US012789542B2

(12) United States Patent
Södergård

(10) Patent No.: US 12,789,542 B2
(45) Date of Patent: Nov. 10, 2026

(54) THERMAL PRINTER AND METHOD

(71) Applicant: Dover Europe Sàrl, Vernier (SE)

(72) Inventor: Jonas Södergård, Vastra Frolunda (SE)

(73) Assignee: Dover Europe Sarl, Vernier (CH)

( * ) Notice: Subject to any disclaimer, the term of this patent is extended or adjusted under 35 U.S.C. 154(b) by 0 days.

(21) Appl. No.: 19/100,488

(22) PCT Filed: Aug. 1, 2023

(86) PCT No.: PCT/EP2023/071288
§ 371 (c)(1),
(2) Date: Jan. 31, 2025

(87) PCT Pub. No.: WO2024/028321
PCT Pub. Date: Feb. 8, 2024

(65) Prior Publication Data

US 2026/0042306 A1 Feb. 12, 2026

(30) Foreign Application Priority Data

Aug. 1, 2022 (SE) .................................... 2250937-6
Aug. 1, 2022 (SE) .................................... 2250938-4
(Continued)

(51) Int. Cl.
*B41J 25/308* (2006.01)
*B41J 2/325* (2006.01)
(Continued)

(52) U.S. Cl.
CPC ............. *B41J 25/308* (2013.01); *B41J 2/325* (2013.01); *B41J 3/4075* (2013.01);
(Continued)

(58) Field of Classification Search
CPC ... B41J 2/32; B41J 15/042; B41J 11/04; B41J 2202/31; B41J 25/312; B41J 3/4075; B65H 2701/192
See application file for complete search history.

(56) References Cited

U.S. PATENT DOCUMENTS 4,617,577 A * 10/1986 Takahashi ................ B41J 17/04
347/215
4,897,670 A * 1/1990 Hasegawa ................ B41J 35/28
347/198
(Continued)

FOREIGN PATENT DOCUMENTS

CN 110978803 B 12/2020
EP 3016866 A1 5/2016
(Continued)

OTHER PUBLICATIONS

International Preliminary Report on Patentability in International Appln. No. PCT/EP2023/071288, mailed on Feb. 4, 2025, 7 pages.
(Continued)

*Primary Examiner* — John P Zimmermann
(74) *Attorney, Agent, or Firm* — Fish & Richardson P.C.

(57) ABSTRACT

The disclosure relates to a thermal printer for printing on print media, comprising: a printhead, a printhead positioning arrangement for displacing the printhead, a ribbon feeding arrangement comprising a print ribbon unwinder and a ribbon rewinder. In operation, the printhead positioning arrangement is configured to displace the printhead into at least three positions: a first position applying a first amount of pressure on a print medium, a second position applying a second amount of pressure on the print medium, and a third position in which the printhead is distanced from the print media and applies no pressure on the print medium.

24 Claims, 13 Drawing Sheets

(30) Foreign Application Priority Data

| | | |
|---|---|---|
| Aug. 1, 2022 | (SE) | 2250939-2 |
| Aug. 1, 2022 | (SE) | 2250940-0 |
| Aug. 1, 2022 | (SE) | 2250941-8 |
| Aug. 1, 2022 | (SE) | 2250942-6 |
| Aug. 1, 2022 | (SE) | 2250943-4 |
| Aug. 1, 2022 | (SE) | 2250944-2 |

(51) Int. Cl.

| | |
|---|---|
| ***B41J 3/407*** | (2006.01) |
| ***B41J 11/00*** | (2006.01) |
| ***B41J 25/312*** | (2006.01) |
| ***B41J 33/36*** | (2006.01) |

(52) U.S. Cl.
CPC ......... *B41J 11/0095* (2013.01); *B41J 25/312* (2013.01); *B41J 33/36* (2013.01); *B41J 2202/31* (2013.01)

(56) References Cited

U.S. PATENT DOCUMENTS

| | | | | |
|---|---|---|---|---|
| 5,531,527 | A * | 7/1996 | Maekawa | B41J 17/32 400/187 |
| 6,183,148 | B1 * | 2/2001 | Martinez | B41J 2/32 400/600.1 |
| 6,227,730 | B1 | 5/2001 | Yorozu et al. | |
| 7,427,132 | B2 * | 9/2008 | Sawai | B41J 29/02 347/198 |
| 7,540,674 | B2 | 6/2009 | Starkey | |
| 8,648,890 | B2 * | 2/2014 | Eoka | B41J 2/325 347/198 |
| 9,545,800 | B2 * | 1/2017 | Murata | B41J 2/32 |
| 9,724,933 | B2 | 8/2017 | McNestry et al. | |
| 9,908,344 | B2 * | 3/2018 | Onodera | B41J 15/16 |
| 10,899,489 | B2 | 1/2021 | Dijkstra et al. | |
| 10,961,007 | B2 | 3/2021 | Pfeffer | |
| 10,988,276 | B2 | 4/2021 | McNestry et al. | |
| 11,192,675 | B2 | 12/2021 | Snedecor et al. | |
| 11,370,574 | B2 | 6/2022 | Eichenberger et al. | |
| 11,504,987 | B2 | 11/2022 | Reiss | |
| 2009/0086006 | A1 * | 4/2009 | Koyabu | B41J 3/60 347/197 |
| 2011/0000620 | A1 | 1/2011 | Dijkstra et al. | |
| 2017/0182812 | A1 | 6/2017 | Sasaki et al. | |
| 2019/0210377 | A1 | 7/2019 | Kuniya | |
| 2020/0130368 | A1 | 4/2020 | Fujita | |
| 2020/0238740 | A1 * | 7/2020 | Yada | B41J 25/308 |
| 2021/0309405 | A1 | 10/2021 | Sodergard et al. | |
| 2026/0034813 | A1 * | 2/2026 | David | B41J 2/32 |

FOREIGN PATENT DOCUMENTS

| | | | |
|---|---|---|---|
| EP | 3131821 | A1 | 2/2017 |
| ES | 2911269 | T3 | 5/2022 |
| JP | H10 250124 | A | 9/1998 |
| JP | 2019206134 | A | 12/2019 |
| SE | 2050220 | A1 | 2/2020 |
| SE | 542756 | C2 | 7/2020 |
| SE | 542931 | C2 | 9/2020 |
| WO | WO 2016080886 | A1 | 5/2016 |

OTHER PUBLICATIONS

International Search Report and Written Opinion in International Appln. No. PCT/EP2023/071288, mailed on Oct. 10, 2023, 9 pages.

* cited by examiner (PRIOR-ART)

THERMAL PRINTER AND METHOD

TECHNICAL FIELD

The disclosure relates generally to an arrangement in a printer. In particular aspects, the disclosure relates to a thermal printer comprising means for controlling printhead position. The device of disclosure can be applied in industrial printer applications in general and label printers, in particular.

BACKGROUND

There is an increasing demand for sustainable solutions, including in the industrial printing market, specifically for label printers and label applicators (Print & Apply). Thermal technology is commonly used for printing labels, including self-adhesive labels. Thermal technology can be divided into two main sub-technologies: Thermal Direct and Thermal Transfer.

Thermal Direct utilizes heat-sensitive labels that change color, contrast, or light reflection when exposed to heat. A thermal print head with a row of small heat elements is used to expose, activate, and modify the contrast in specific areas of the label as it passes by the print head, or vice versa.

Thermal Transfer involves the use of a heat-sensitive ink ribbon that holds the ink, creating contrast. It also utilizes a thermal print head with a row of small heat elements to transfer the ink from the ribbon to the label.

The ink ribbon may consist of several layers: a substrate, an ink layer, and a back coating. The substrate is usually made of polyester and provides support to the ribbon. The ink layer contains the actual ink, which usually may comprise a wax, resin, or a combination of both. The back coating helps protect the printhead from damage and ensures smooth movement through the printer.

When printing, the ink ribbon is placed between the printhead and the print media. The printer applies heat to the printhead, causing the ink on the ribbon to melt and transfer onto the print media, such as for example paper or label. The ink adheres to the print media, resulting in a permanent image.

Thermal transfer printers are commonly used in applications that require high-quality, long-lasting prints, such as barcode labels, product packaging, and identification tags. The use of ink ribbons may provide greater durability and resistance to environmental factors, making the printed output more resistant to fading, moisture, and abrasion compared to direct thermal printing.

There are two primary types of thermal printheads: Near-edge and Flathead.

Near-edge printheads, sometimes called corner-edge printheads, have the row of heat elements positioned close to the edge of the printhead. This allows for rapid heat transfer from the heat elements to the ink ribbon, enabling high printing speeds. However, the proximity to the corner makes the heat elements more exposed and susceptible to debris. The ink ribbon helps protect the printhead. Near-edge printheads are not well suited for direct thermal applications. One significant advantage of near-edge printheads is that they allow for highspeed printing and can be lifted away from the label, allowing the ink ribbon to stop when not in use. This feature is commonly known as “ribbon save”.

Flathead printheads have the row of heat elements positioned further from the corner of the printhead, and the printheads are set at a more horizontal angle relative to the label compared to near-edge printheads. Flathead printheads are generally more robust than near-edge printheads, but they print at lower top speeds and require alignment with the drive roller within small tolerances to work properly against the label. The flathead printhead may need precise alignment with the print/drive roller beneath the label to achieve good print quality. One significant advantage of flathead printheads is their ability to be used in both thermal transfer and direct thermal applications.

FIG. 1 illustrates an exemplary printer 10 known in the prior art. The exemplary printer 10 may comprise an exemplary label printer 10, comprising a printhead 11, a label supply spool 12 of label stock mounted to a supply spool support 13, a take up spool 14, an ink ribbon supply spool 15, an ink ribbon take-up spool 16, and a number of rollers 17; 18 and 19.

The label stock extends along a web path 20 from the supply spool 12 around the roller 17, along the roller 19, over the drive roller 18, around a labelling peel beak 21, and is wound onto the take up spool 14.

The ink ribbon extends from the supply spool 15, passes the printhead’s 11 print elements (not shown) and is wound onto the take up spool 16. In this embodiment, the print head comprises a near-edge printhead. During the printing operation, the ink carried on the ribbon is transferred to the label which is to be printed. To affect the transfer of ink, the printhead is brought into contact with the ribbon, and the ribbon is brought into contact with the label and pressed onto the drive roller 18.

SUMMARY

The present disclosure presents methods and arrangements to handle printhead of a printer, especially in an industrial printer, in such a way that the thermal print ribbon and/or printhead and/or print/drive roller is saved during nonprinting and/or service time.

The exemplary arrangements of the present disclosure provide features such as lifting a printhead in several positions, providing accurate print head alignment and thus secured print quality regardless of print head type under the full range of pressures, fast operation and accurate label transportation as well as ink ribbon transportation.

According to a first aspect, a thermal printer for printing on a print media, comprising: a printhead, a printhead positioning arrangement for displacing the printhead, a ribbon feeding arrangement comprising a print ribbon unwinder and a ribbon rewinder, at least one roller. In operation, the printhead positioning arrangement is configured to displace the printhead into at least three positions: a first position applying a first amount of pressure on a print media, a second position applying a second amount of pressure on the print media, and a third position in which the printhead is distanced from the print media and applies no pressure on the print media. In one exemplary embodiment, the printhead positioning arrangement is configured to apply same pressures as applied to the print media on the print ribbon configured to run substantially parallel with the print media. In another example, the printhead positioning arrangement comprises a first arm, at an end connected to an actuator and an axis rotatably attaching the printhead to a support structure, and wherein the first arm is configured to displace the printhead into said at least three positions. In one example, the first arm is mechanically and rotatably connected to a printhead support structure and thus the print head between the at least three positions. Thus, the second arm is configured to apply a force on a printhead support structure. In one example the thermal printer may further comprise a sensor configured to provide position of the actuator connected to the first arm at startup. A memory may be arranged and configured to store a reference position a fixed stop position for movement of the first arm. In one example, the second position the printhead is adjacent to but distanced from the print ribbon between the print media and the printhead.

According to a second aspect, a method for controlling position of a printhead in a thermal printer is provided. The thermal printer comprising: a printhead positioning arrangement for displacing the printhead, a print ribbon feeding arrangement comprising a ribbon unwinder and a ribbon rewinder, at least one roller. The method comprises: displacing the printhead into at least three positions: a first position applying a first amount of pressure on a print media between the printhead and the roller during a print operation; a second position applying a second amount of pressure on the print media when no print operation is executed, a third position in which the printhead is distanced from the print media and applies no pressure on the print media. The method may comprise in said first position receiving information indicative of printhead position applying a predetermined force, $F_{dot}$, on the printhead; in the first position when an active print assignment is ended, displacing the printhead to the second position; optionally moving to the third position upon reception of an instruction. In one example the rewinder is torque controlled in said first position and speed controlled in said third position. The method may further comprise: in a first position, controlling a web path by the roller with a predetermined pressure of the printhead against the roller; measuring a length of the print media and a print media rewind diameter; displacing the printhead to the second position during a print cycle but not active printing with respect to the measured length and a rewind diameter; and controlling label rewind speed, wherein the print media feed is assisted at least by the roller having print media pushing against it during the print cycle. The first position is printing position, the second position is a non-printing position and the third positions allows access to thermal printer parts. In one example, the second position the printhead is adjacent to but distanced from the print ribbon between the print media and the printhead.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples. Reference is made to the attached drawings, wherein elements having the same reference number designation may represent like elements throughout.

DETAILED DESCRIPTION

Figure 1:
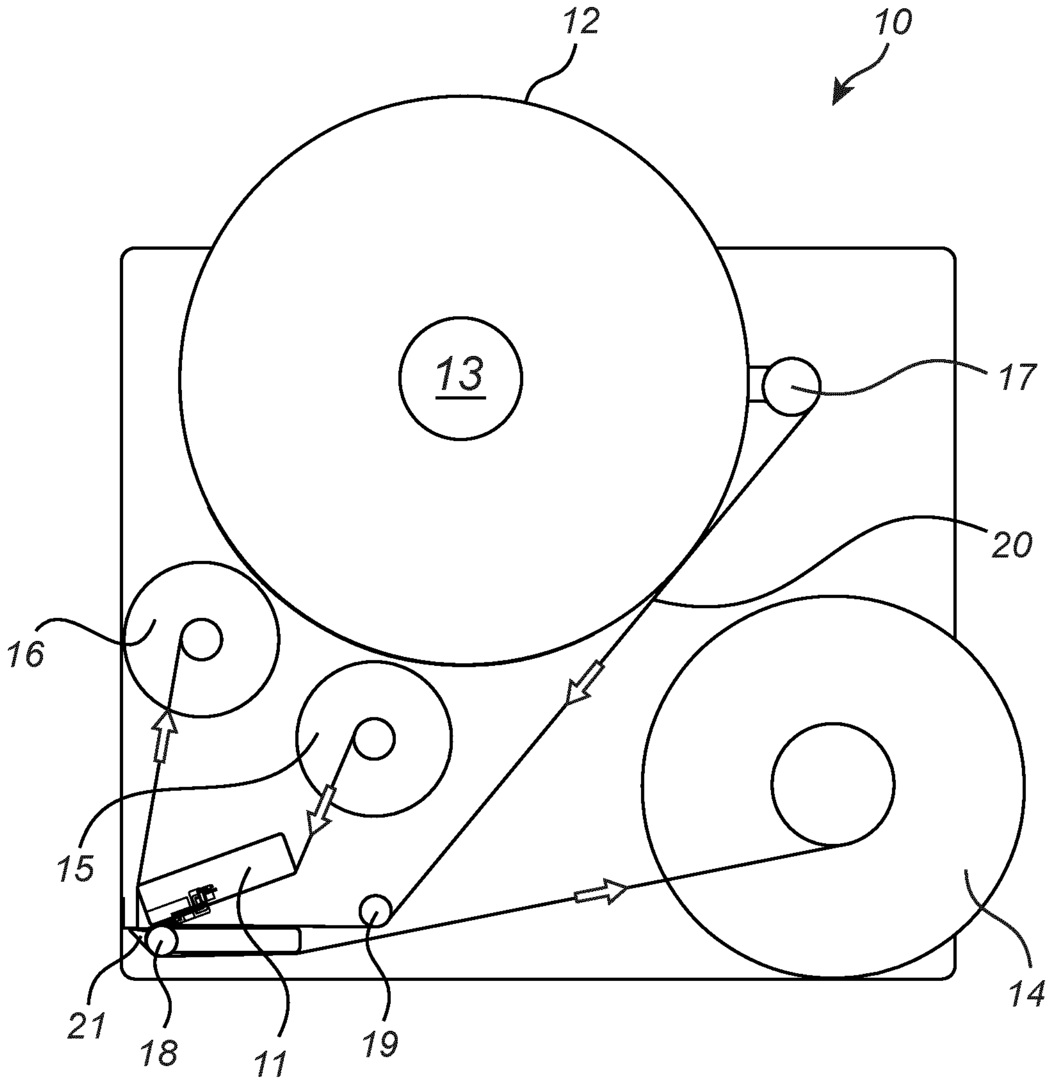
FIG. 1 depicts an exemplary printer according to prior art.

The term "industrial printer", also known as an "industrial-grade printer", as used herein, may refer to a type of printer specifically designed for heavy-duty printing tasks in industrial environments. These types of printers are built to handle large volumes of printing, often with high-speed and precision, and are capable of printing on various materials such as paper, cardboard, labels, plastics, and metals. The industrial printers, as referred to herein, may commonly be used in sectors like manufacturing, logistics, packaging, and retail, where there is a need for efficient and reliable printing solutions. They are typically more robust and durable compared to standard office printers, as they are required to withstand harsher conditions and extended operation periods.

Depending on the specific application, industrial label printers may utilize different printing technologies. Some common types may include:

- Thermal Transfer Printers (TTP): These printers use heat to transfer ink from a ribbon onto the printing material, such as labels or tags. They are widely used for barcode printing and labeling applications.
- Direct Thermal Printers (DTP): These printers use heat-sensitive paper that turns black when exposed to heat, creating the desired print. They are commonly used for printing receipts, shipping labels, or temporary labels.
- Inkjet Printers: Industrial inkjet printers use inkjet technology to propel tiny droplets of ink onto the printing surface. They can print high-resolution images and are suitable for printing on various materials, including paper, plastics, and metals.
- Laser Printers: Industrial laser printers use laser technology to create the desired print. They are often used for high-speed and high-volume printing applications.

Industrial printers may also incorporate additional features, such as advanced connectivity options, rugged enclosures, automatic label applicators, online verification, imaging solutions, or integrated systems for data management and control. These features enhance their productivity, efficiency, and integration with other industrial processes.

The thermal printer may also comprise Thermal Transfer Overprinter (TTO) technology, in which printers also use a thermal transfer printing method. The printer has a thermal printhead, which contains an array of tiny heating elements. When the printhead comes into contact with the (thermal transfer) ribbon and the packaging material, it selectively heats the ribbon to transfer ink onto the substrate, creating the desired print. TTO printers are commonly used for flexible packaging materials, such as films, foils, paper, and labels. They can print on various packaging surfaces, including continuous web materials or pre-formed packages like bags and pouches.

The terms “ribbon”, “color ribbon” or “ink ribbon” as used herein may generally refer to a consumable component used to transfer ink onto the print media, typically paper or labels.

The term “label”, as used herein, may include an information carrier media which can be made of several types of materials, depending on the specific requirements and application. Some common materials used for printer labels may for example include (but not limited to): paper, synthetic materials, cardstock, clear and transparent materials, thermal labels, and specialty materials.

The term “label backing paper” or “liner”, as used herein, may comprise different a carrier and the carrier may be made of different materials. The carrier may comprise a protective layer that covers the adhesive side of a label before it is applied to a surface. It is designed to be easily peeled off, allowing the label to be stuck in place.

The present disclosure relates to a design and arrangements for saving printhead and/or ink ribbon, which is capable of handling both near-edge and flathead printheads. In case of flathead printhead scenario, the arrangement of the disclosure may allow one printer to print using both direct thermal labels and thermal transfer ribbon. This provides full flexibility to switch between the two technologies without wasting more ink ribbon than necessary when using the thermal transfer technology.

The arrangement, as described in the following, allows at least three positions for a printhead: a print position, a ribbon and/or printhead and/or drive roller save position and a service position. It also gives suitable gearing for all three positions. Furthermore, there are no parts being exposed to wear or any surfaces rubbing against each other without a bearing between them.

Figure 2:
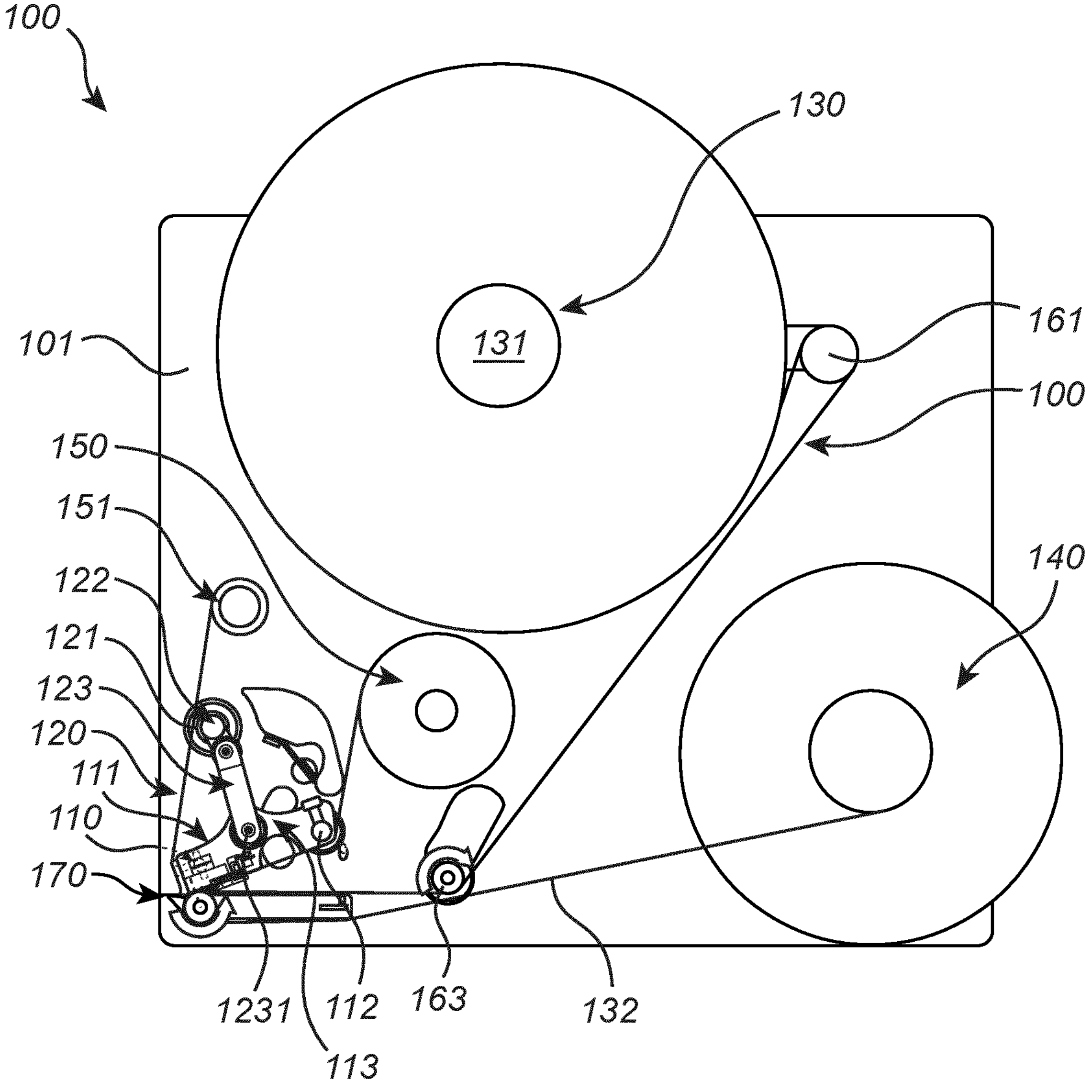
FIG. 2 illustrates a schematic side view of a printer comprising an exemplary arrangement according to a first aspect of the disclosure.

An exemplary printer 100 comprising an arrangement for positioning a printhead 110 according to the present disclosure is illustrated schematically in FIG. 2. The printer 100 further comprises an arrangement 120 for displacing the printhead 110, a label supply spool 130 of label stock mounted to a supply spool support 131, a label take up spool 140, an ink ribbon supply spool 150, an ink ribbon take-up spool 151, a number of (drive) rollers 161; 162 and 163, and label peel beak 170.

The printhead 110 may be mounted on one or several printhead brackets 111. In the case of for example two brackets, the printhead can be sandwiched between the two brackets.

The printhead displacement arrangement 120, according to this example, comprises a driving mechanism, such as a motor (not shown), a drive shaft 121, a first arm 122, a second arm 123, and a second arm shaft 1231.

The bracket 111 is substantially rectangular with a substantially bulging midsection 113. The bracket 111 is rotatably attached to a printer support wall or main frame by means of a holder shaft 112 at one end opposite print elements of the printhead. The second arm 123 of the displacement arrangement is rotatably attached to the substantially bulging section 113 of the bracket by means of the second arm shaft 1231 at one end of the second arm. At the other end, the second arm 123 is rotatably attached to one end of the first arm 122 by means of shaft or pin. The first arm 122 at the other end is attached to the drive shaft 121. The drive shaft 121 is associated with a motor, e.g., by means of a gear, gearbox or a drive belt, such as a timing belt. Consequently, this allows the printhead in connection with the bracket 111 to rotatably be displaced around the axis of the shaft 112.

The actuator/motor, and motors for rollers and spools supports may be controlled by a controller, which will be described in more detail below.

FIG. 2 further illustrates the printhead 110 in a print position. When the print head is in the print position with a correct (sufficient) pressure against the front drive roller 162, the packing paper track/speed (e.g., by driving by the drive roller the web follows) may mainly be controlled by the front drive roller 162. The rear drive roller 163 follows the front drive roller but in reversed direction (presented by arrows). In one embodiment, a first label after a label change is printed with the printhead in the print position during the complete print cycle. During this print cycle the label rewinder may mainly be torque controlled. This allows to feed a known portion of the backing paper and measure the label rewinder diameter. The printer controller may have information about the known portion of the backing paper, which controls the roller and the label web path. When the two parameters, label length and label rewinder diameter, are known it is possible to lift the printhead during the print cycle to save ribbon when no print is required. This also saves printhead wear and front driver roller wear. The speed(/position) of label rewinder may then mainly be controlled to make sure the label is fed correctly.

When the printer starts operating, e.g., either for a media/gap sensor calibration or for printing a label, a “print” torque is applied to the motor. The print torque may result in applying a pressure by printhead on the print media of approximately 25-50 N. A print torque is calculated by the controller and the calculated “print” torque for all relevant possible locations for print position can be stored in a controller memory. The possible position for the print position can vary due to variations in label thickness, drive roller wear and print head thickness variations. The “print” torque can be pre-calculated using the resulting gearing from the resulting arm angles using the actual printhead position for print position and can be defined as number of motor pulses below the reference position. Consequently, the printhead is now in print position and pushed with a “print” torque.

The feed of the paper track may be assisted by the rear drive roller 163, which has a paper track pushing against it during the print cycle.

Figure 3:
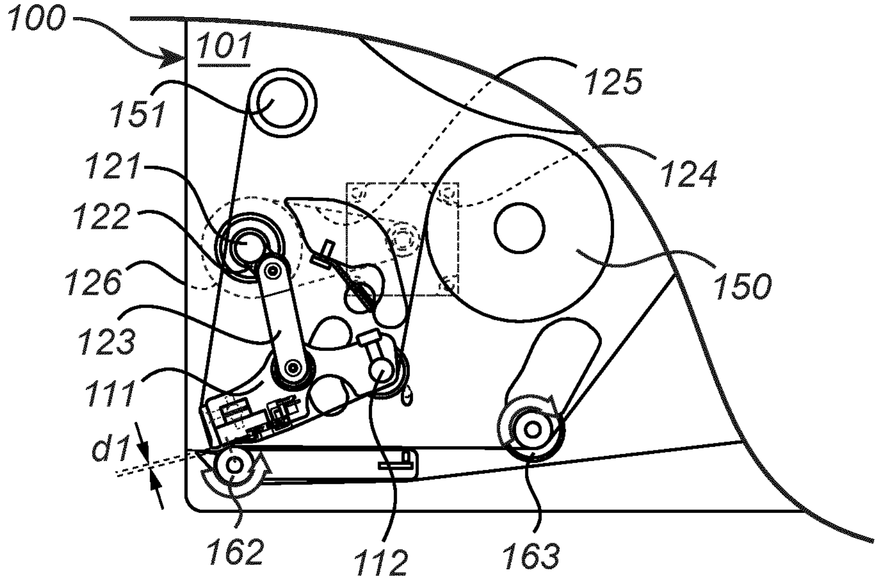
FIG. 3 illustrates a part of the printer of FIG. 2 in a first operational state.

FIG. 3 illustrates a portion of the printer 100 in FIG. 2. As mentioned previously, the printhead lift mechanism 120 is controlled by the motor 124 and the two arms 122 and 123, to position the printhead bracket 111 and thereby the printhead 110. The motor 124 and the drive mechanism of the arms, comprising a belt 125 and a pulley 126 are illustrated with dashed lines as they may be arranged behind a support wall or main frame 101. The motor may be a stepper motor or a brushless motor, which may be arranged with a drive wheel on the shaft and connected to the pulley 126 through the belt 125.

The first arm 122 is driven by the motor 124 and the second arm 123 is connected to the first arm and to the bracket 111 holding the printhead. The motor's rotation position may for example be measured by an encoder and the motor torque can for example be measured by measuring drive motor current. At startup, the printhead position system can be calibrated using a sensor or for example by operating to an upper stop position. The sensor can for example be a printhead positioning rotation sensor or a relative printhead positioning sensor. Then by measuring the torque and the position the printhead is lifted and pushed down with a known force. The printhead lift mechanism may also be designed to allow for a high-pressure force needed when the printhead is adjacent the label. In FIG. 3, the motor has rotated contraclockwise which has rotated the pulley 126 contraclockwise rotating the first arm 122, which is fixed to the drive shaft of the pulley 126, the first arm follows the pulleys rotation and rotates along the centre axis of the shaft 121, pulling the second arm 123 upwards (with respect to the drawings plane). This movement pulls the bracket 111 at the midsection which rotates along the centre axis of the shaft 112 and consequently the printhead 110 is lifted. The printhead has no contact with the ribbon or the label and consequently no wear on the ribbon or the printhead and thus wear on both printhead, diver roller and ribbon is avoided.

Of course, the belt and the pulley may be substituted with gears and gearbox or any other suitable driving mechanism.

In some exemplary embodiments, when the printer operates in direct thermal mode and an area with no print assignment is reached, then the motor can be switched to a "printhead save" torque until a print assignment is obtained again whereby the motor switches back to "print" torque. This may very slightly change the mechanical printhead position due to reduced compression of the drive/print roller, however there is no need for the motor controller to actively assume a new position.

Figure 4:
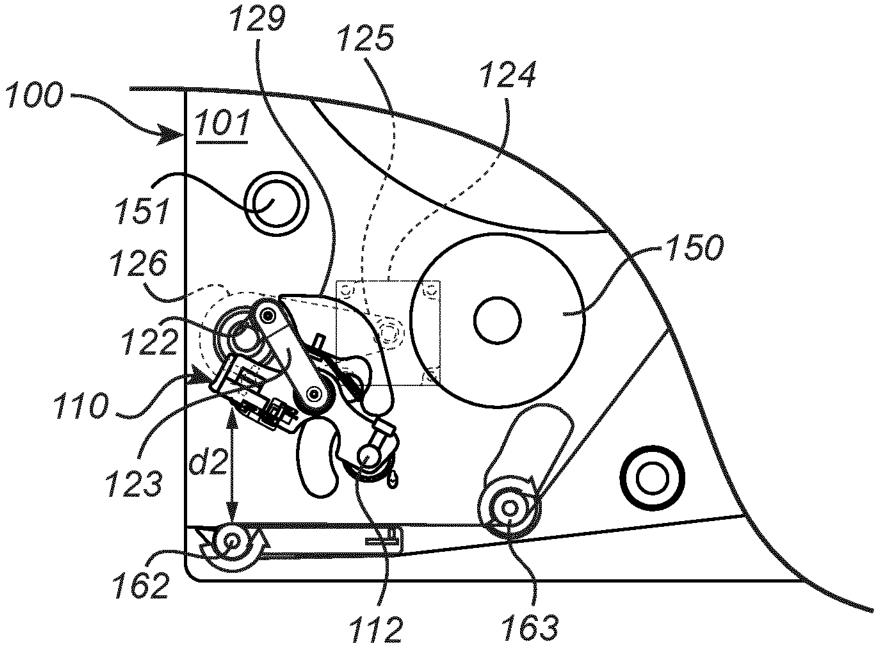
FIG. 4 illustrates a part of the printer of FIG. 2 in a second operational state.

The printhead may move further away from the label (or print media) and print/drive roller when access is needed, for example for label change or cleaning operation, i.e., service position. FIG. 4 illustrates the same portion of the printer 100 as in FIG. 3.

In FIG. 4, the motor 124 has further rotated contraclockwise, which has rotated the pulley 126 also contraclockwise, rotating the first arm 122 pulling the second arm 123 further upwards (with respect to the drawings plane). The bracket 111 is puled further at the midsection and rotates along the centre axis of the shaft 112 and consequently the printhead 110 is further lifted. This allows for easy access to the interior of the printer, especially space between the printhead and the front roller 162 and allows easy change of labels, clean or replace the drive roller or clean or replace the print head.

In one embodiment, the ribbon (and/or the printhead) save position the distance $d_1$, i.e. the distance between the printhead elements and the ribbon/media (label) may be less than 0.1 mm-2 mm, preferably less than 1 mm above the print position meaning the movement from print position to ribbon save position is fast.

In one embodiment, in the service position the distance $d_2$, i.e., the distance between the printhead elements and the ribbon/media (label) may be 2 cm-10 cm, preferably 6 cm above the print position.

During the print operation when an area with no print is indicated and it is permitted to lift the printhead, the controller displaces the printhead to ribbon save position, which also saves wear on printhead and the roller 162. Ribbon save may also be defined as n pulses above print position, i.e. n pulses (control signals) to step or drive the motor. The print position may be re-defined every time it is reached. When ribbon save position is reached, the motor position is hold. As soon as a print operation is required, the motor is rotated in an opposite direction, moving the printhead to the print position again by applying "print" torque. As the distance between ribbon save position and the print position is short, the need for speed control of label (print media) feed may be eliminated.

The printer may need to calibrate the position of the printhead. For this reason, the printhead is lifted at a fixed low speed until the motor is stopped. This can be defined by the controller as absence of incoming pulses from the pulse encoder on the motor during a set period of time. The motor torque can be limited through a motor current limitation.

The stop position is stored in a memory communicating with the controller as a "reference" position. In one embodiment, the stop position may be defined as the position when the motor cannot drive further because the first arm 123 is prevented to move further by a part 129 (e.g., FIG. 4). The service position may be defined as m motor pulses (forward or backwards depending on the configuration) from the "reference" position. In cases of moving the printhead up and down, it is m pulses below the reference position. Then the motor is provided with m pulses down to the service position. When the service position is reached the position is held until a user carries out the necessary operation and activates the printer. The service position can be entered manually by a user (operator) or automatically if for example the printer detects a service of the printer is required, the printer is out of label or ribbon.

When the printer is set in active mode, the printhead is moved from service mode at a fixed speed. The gearing provided by the two arms will slow down the speed and increase the torque as the printhead approaches the drive/print roller. When the motor stops, which is defined as absence of pulses from the motor pulse encoder, then an idle torque may be applied to the motor. The printhead is now in print position and pushed towards the print media and roller with the "idle" torque. In some exemplary embodiments, the idle torque can be less than substantially 50% to 90%, preferably 75% of the print torque.

Figure 5:
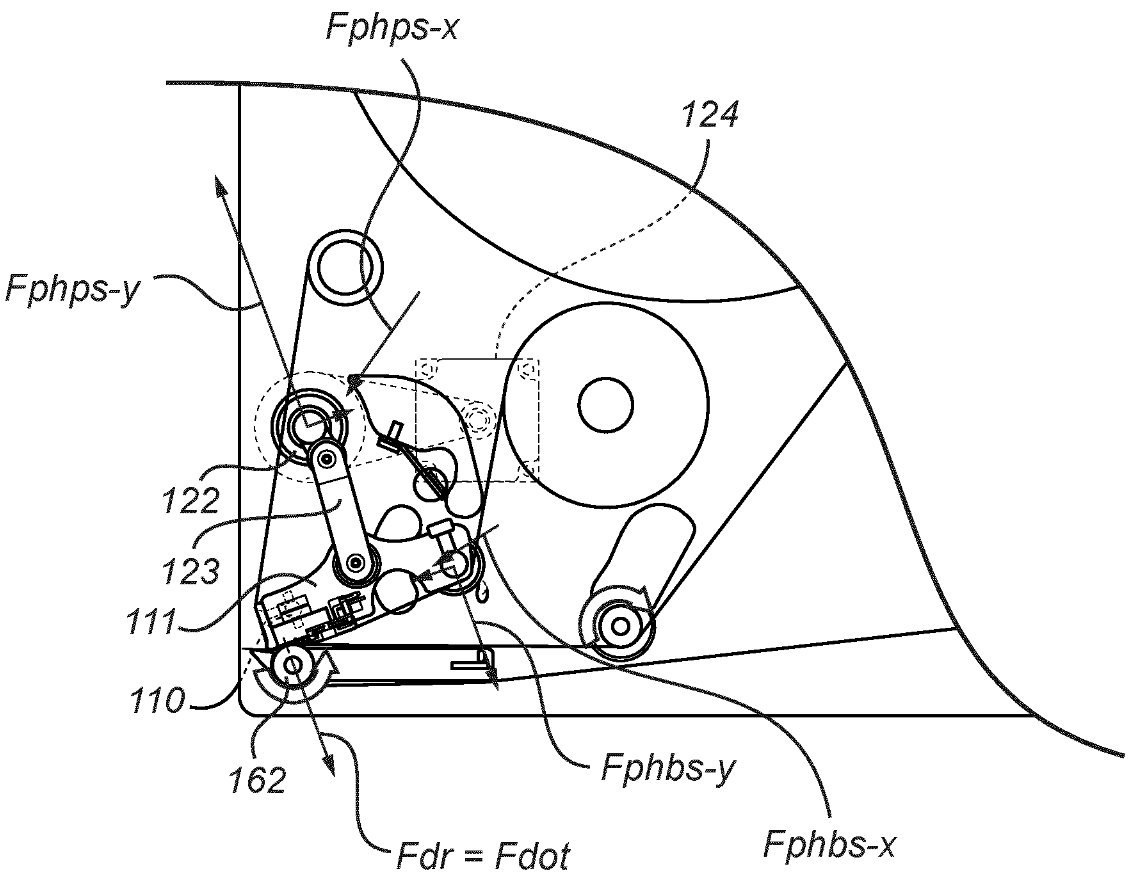
FIG. 5 schematically shows how the forces cancel out each other for increased rigidity and print quality.

FIG. 5 depicts how some of the forces in the printer components cancel out each other for increased rigidity and print quality. In the print position, the angle of the two arms 122, and 123 is such that the corresponding gearing between the motor 124 and a distance d is low and $F_{dot}$ is high. If the motor instead had been engaging the printhead bracket shaft 1231, then the gearing should be significantly higher, in one embodiment it can be 17:1 which is 5.67 times higher than the 3:1 according to the present disclosure, implying that a gearbox could be required.

The precise arm angle and thus the precise gearing can continuously be monitored. This may be achieved through calculation of the angle, a lookup table, etc. Variations in the label thickness, print head thickness and drive roller diameter may change over time, which may result in a change in the arm angles and thus gearing, e.g., by input from the motor shaft angle. The amount of the motor torque may then be adjusted to achieve a substantially constant and correct pressure ($F_{dot}$) against the drive roller 162.

The first arm 122 and the print head bracket 111 may both be connected with ball bearings in common mechanical parts on both the inner and the outer sides of the print head, this to ensure exact tolerances and rigidity.

Figure 6:
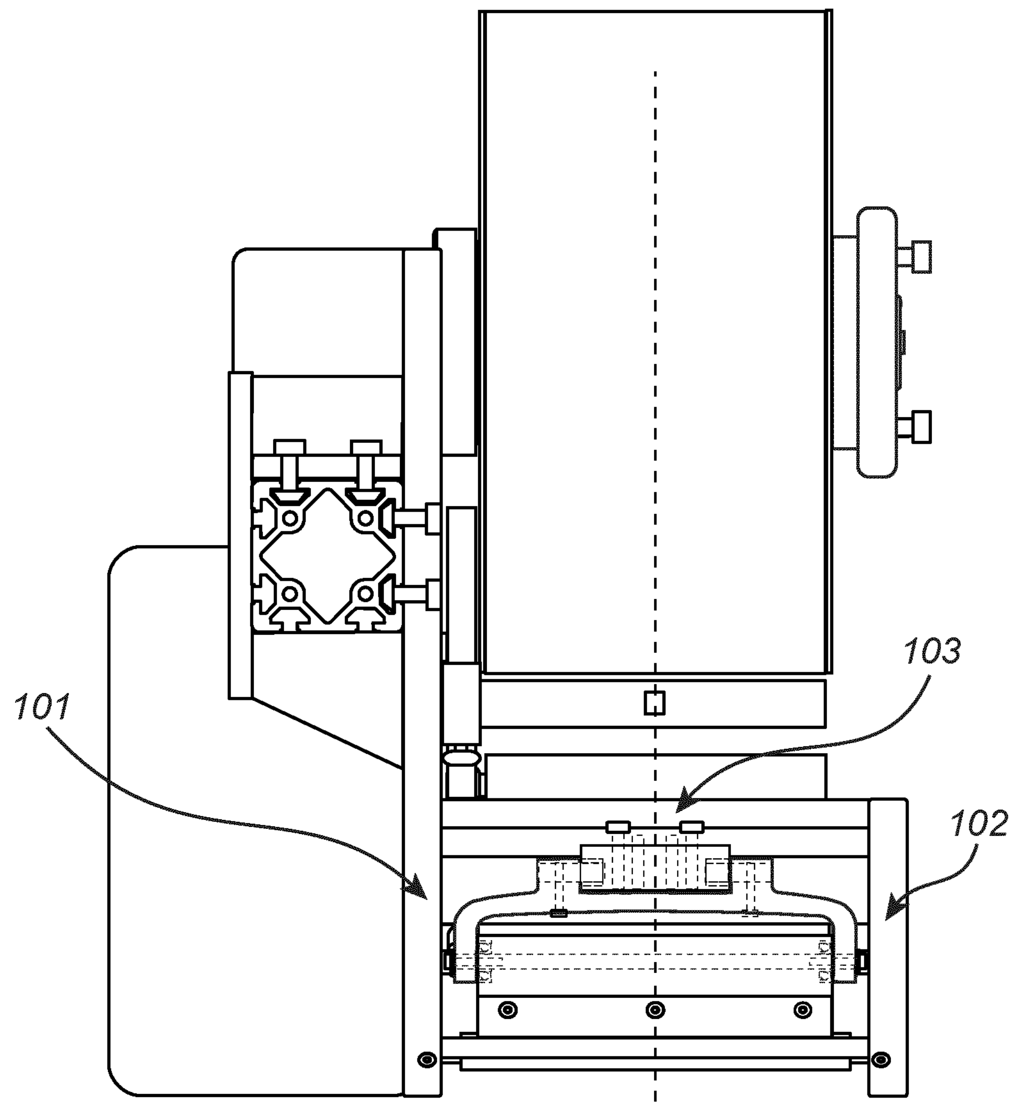
FIG. 6 illustrates a frontal view of the printer of FIG. 2.

The arrangement of the disclosure also cancels out most torsion forces in the outer common bracket 102 (FIG. 6) leaving only $F_{phps-x}$ and the equally sized and opposite directed $F_{phbs-x}$. This cancellation puts less stress on the connection between the inner and outer brackets 103 (FIG. 6). This minimized torsion between the inner and outer brackets secures correct alignment of the print head even at the relatively high forces needed for thermal print heads, e.g., of flathead type.

Figure 7:
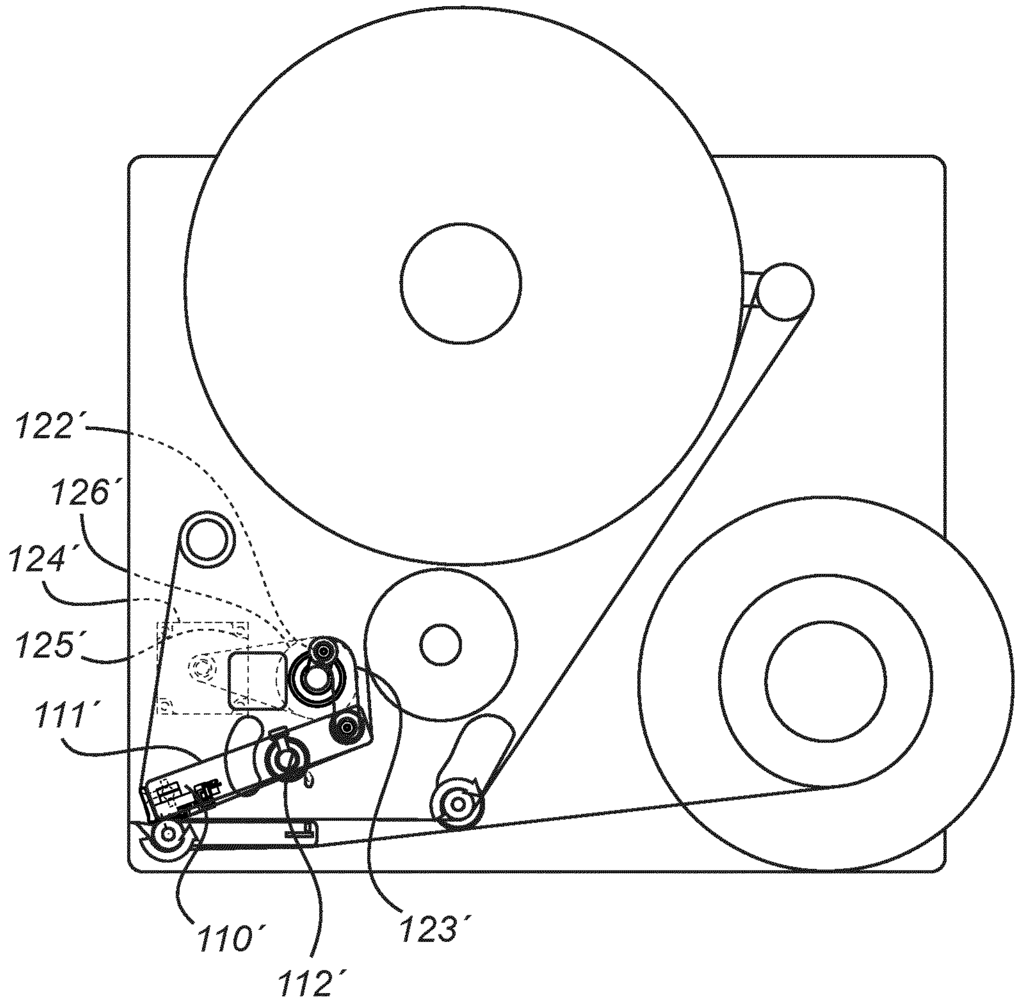
FIG. 7 illustrates a schematic side view of a printer comprising an exemplary arrangement according to a second aspect of the disclosure.
Figure 8:
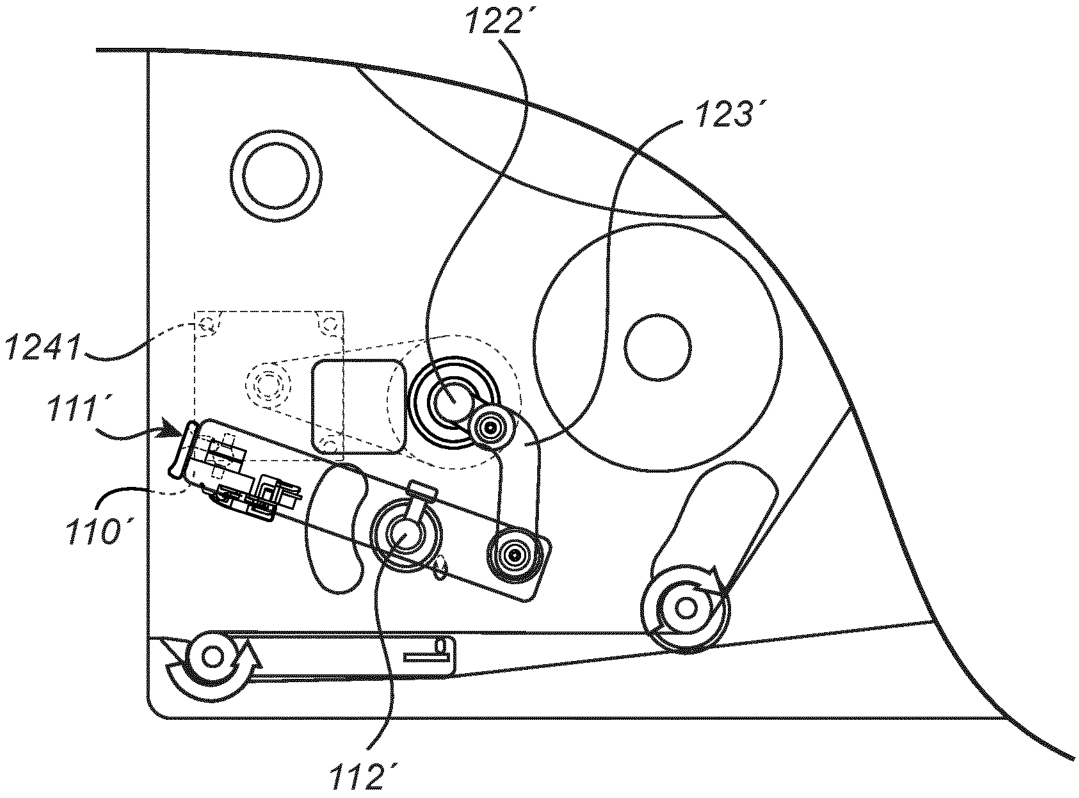
FIG. 8 illustrates a part of the printer of FIG. 7 in another operational state.

FIGS. 7 and 8 depict an alternative solution of driving mechanism for displacing the printhead 110'. In this case, the bracket is provided with a shaft 112' in substantially mid-section of the substantially rectangular bracket 111'. The driving mechanism further comprises a motor 124' connected via a driving belt 125' to a pulley 126' connected to the first arm 122'. The first arm 122' is connected rotatably to the second arm 123' which is connected to an end section of the bracket 111'. The bracket 111' is pivotably arranged on the shaft 112'. The second arm 123' is slightly curved at the end connected to the first arm. The motor 124' is displaced to a front section of the printer, i.e. the label feed side of the printer.

FIG. 7 illustrates the printhead 110' in the print position as the second arm lifts the end of the bracket 111' and applies a pressure towards the front roller.

FIG. 8 illustrates the printhead in so called service position. The motor 124' has rotated clockwise driving the pulley 126' to rotate, which rotates the first arm upwards pushing the second arm 123' downwards, which pushes the bracket's 111' end downward and the bracket pivots around the rotation axis of shaft 112' lifting the printhead 110' into the service position. All directions are with respect to the plane of the drawing.

The printhead and ribbon save positions are achieved by slightly rotating the motor clockwise from print position, for example.

Figure 9:
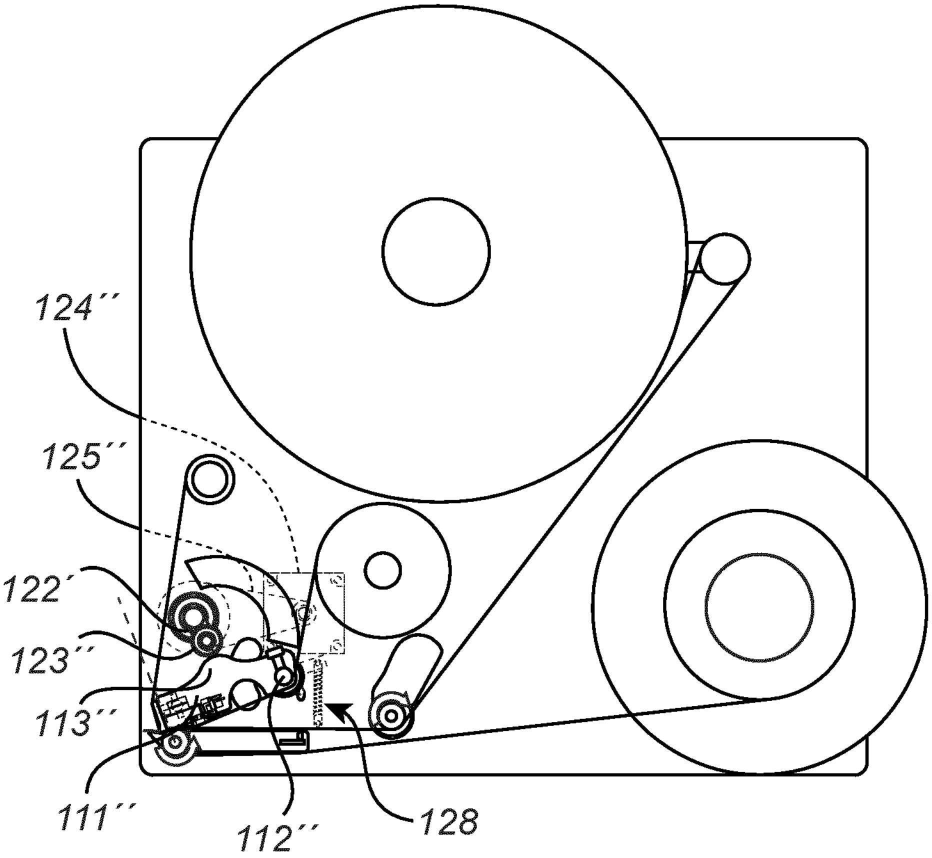
FIG. 9 illustrates a schematic side view of a printer comprising an exemplary arrangement according to a third aspect of the disclosure.
Figure 10:
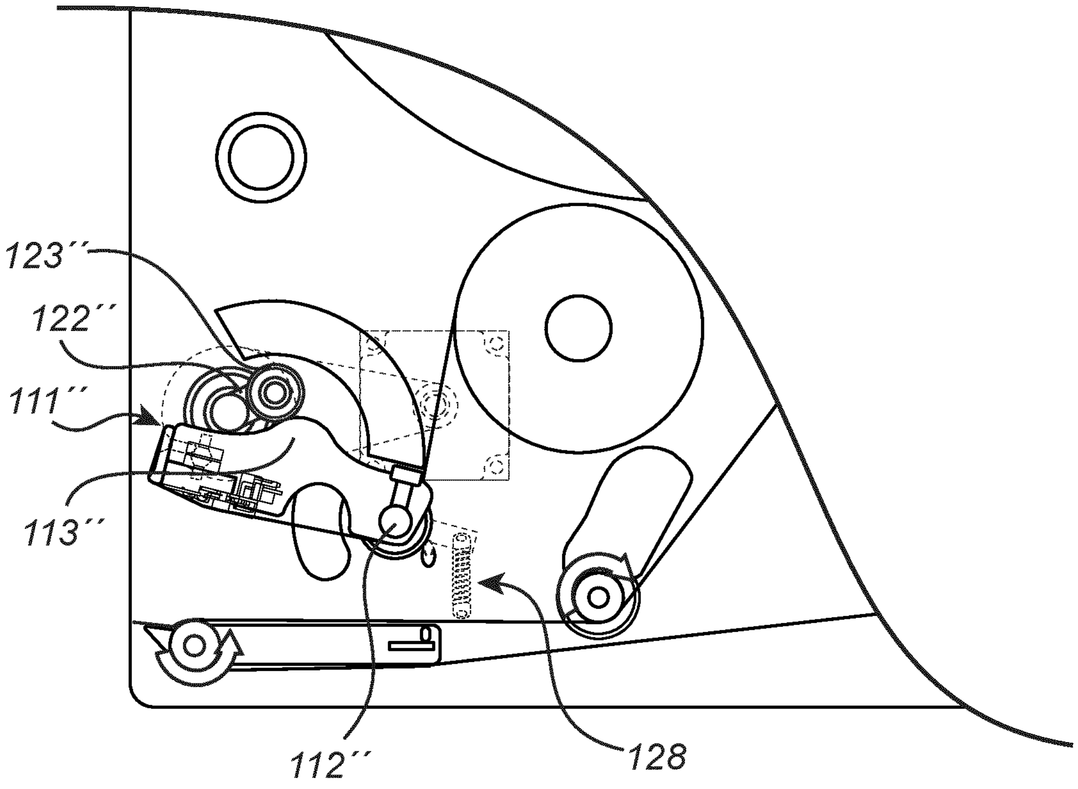
FIG. 10 illustrates a part of the printer of FIG. 9 in another operational state.

FIGS. 9 and 10 depict yet another alternative solution of the driving mechanism for displacing the printhead 110". In this case the bracket 111" is provided with a shaft 112" in the substantially end section of the substantially rectangular bracket 111". The bracket 111" comprises a bulging mid-section in upper side, shaped substantially as a sinus curve cent. The driving mechanism further comprises a motor 124" connected via a driving belt 125" to a pulley 126" connected to the first arm 122". The first arm 122" is connected rotatably and rollable to a substantially circular or wheel shaped actuator 123", which is in contact with bulging midsection 113" of the bracket 111". The bracket 111" is rotatably arranged on the shaft 112". The end section of the bracket 111" is via an extension is provided with a spring 128 connected to bottom section of the printer. The spring 128 is arranged to pull the end section of the bracket downwards. Clearly the operation of the spring and direction of movements can be changed.

FIG. 9 illustrates the printhead 110" in the print position as the actuator 123" applies a pressure on top of the bulging section and lifts the end section of the bracket 111", biasing the spring 128 and applies a pressure towards the front roller (and ribbon/media). The printhead and ribbon save positions are achieved by slightly rotating the motor contraclockwise from print position, for example.

FIG. 10 illustrates the printhead in service position. The motor 124" has rotated contraclockwise driving the pulley 126' to rotate, which rotates the first arm upwards rolling the actuator 123" over the bulging section, which allows the spring to pull back the bracket's 111" end downwards and the bracket pivots around the rotation axis of shaft 112" lifting the printhead 110" into the service position.

In some exemplary embodiment, the actuation for displacing the printhead can be directly driven from the motor or through a flexible coupling with a defined characteristic. In some exemplary embodiment, the user/operator may be set the printhead in the service position and keep the head lifted and use the printer as label dispenser.

Figure 11:
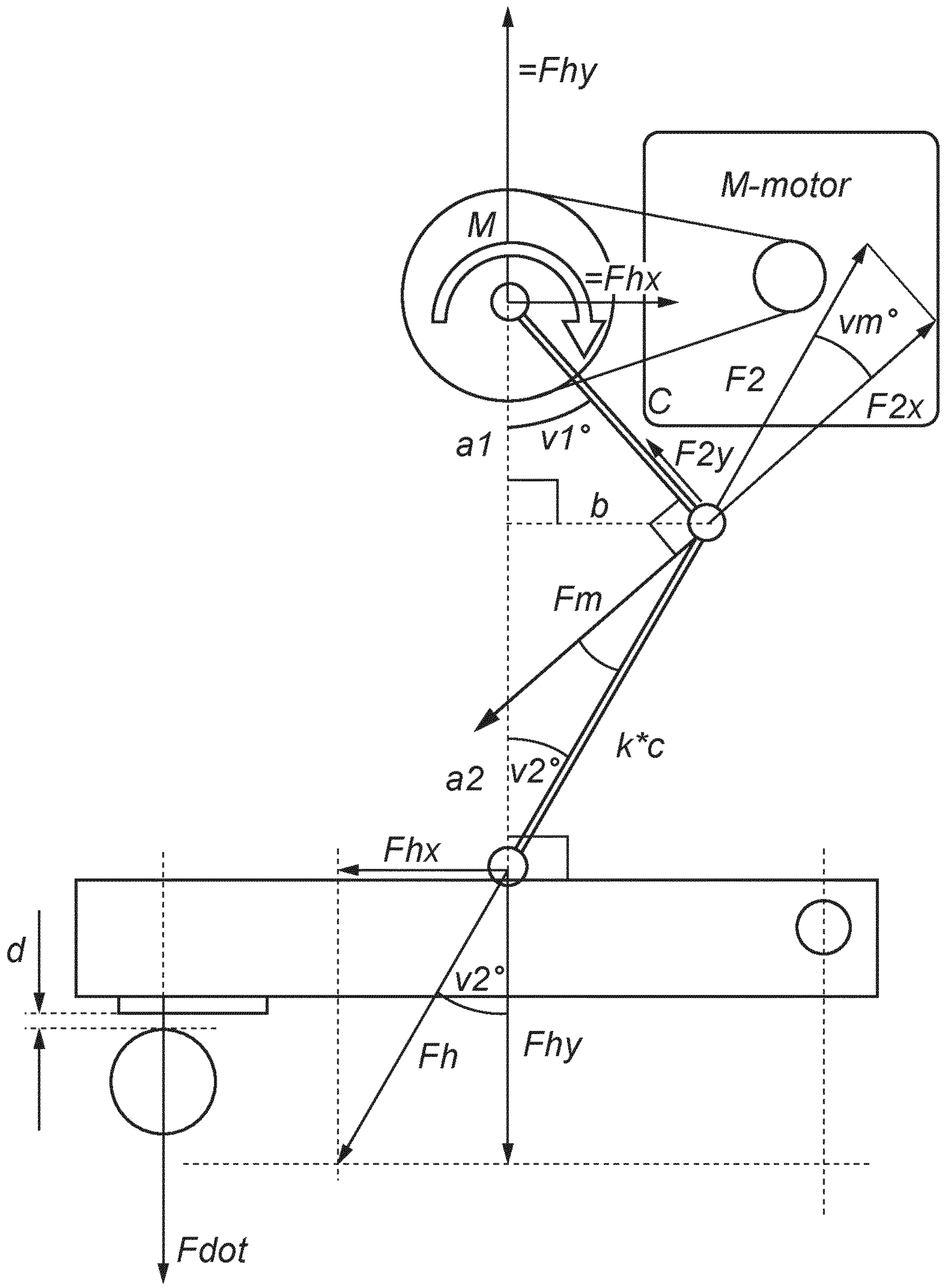
FIG. 11 is schematic and exemplary representation of a printer arrangement according to FIG. 2.

FIG. 11 shows an exemplary presentation of how the parameters for a printhead controller can be set. A typical printhead of flat head type may need to be pushed with a force, measured at the dot row ($F_{dot}$) of 40N against the drive roller. In addition, there may be variations in some main factors that the design needs to be robust enough to handle. These factors may include:

variations in label thickness;
varying print head thickness; and
drive roller diameter changes due to wear.

The variations are also measured at the dot row adding up to a total tolerance (d mm).

Measured at the dot row, the label thickness may vary less than 0.5 mm, the print head thickness will vary less than 0.5 mm and the drive roller will vary less than 0.5 mm (equal to less than 1 mm drive roller diameter reduction). The total needed tolerance at d is thus 1.5 mm.

The example will manage this needed tolerance of 1.5 mm with a good margin. The distance d may be allowed to vary up to 2.51 mm whilst maintaining $F_{dot}$>40 N. This may be managed with a brushless DC (BLDC) motor capable of delivering 0.21 Nm torque and a 3:1 reduction gear before driving ribbon arm 1. Ribbon arm 2 is connected to ribbon arm 1 and the print head bracket.

This drawing also shows by way of example how the torsion forces ($F_{hx}$) are maximum 14.58N. This is to compare with if the print head bracket had been driven directly through the print head bracket shaft. The torsion forces would then have been 30-50 N, preferably 40 N, which is a 174.3% higher than 14.58 N.

Figure 12:
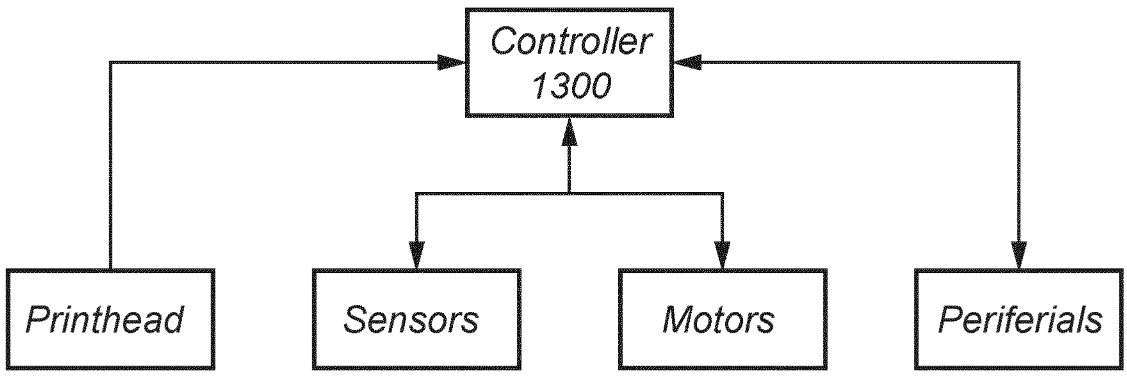
FIG. 12 is a schematic view of an exemplary controller and connected entities.

FIG. 12 is an exemplary controller 1300 communicating with and/or controlling various units of an exemplary printer, e.g., such as a printer described previously in the disclosure. The controller 1300 may communicate with various sensors of the printer, such as the encoder for motors 124, 124' and 124". The motors may include motors for driving the spools, printhead displacement motors, rollers, etc. The controller may also be part of the printer controller controlling the operation of the printhead, and also communicate with other devices.

In some exemplary embodiments, the arrangement of the disclosure can be implemented in label printers using linerless labels. In this case, a linerless label stock, which may consist of adhesive-coated labels without any backing material are used. After the labels are printed and (pre-)cut, they are peeled off from the roll, one after the other presented to the label applicator.

Figure 13:
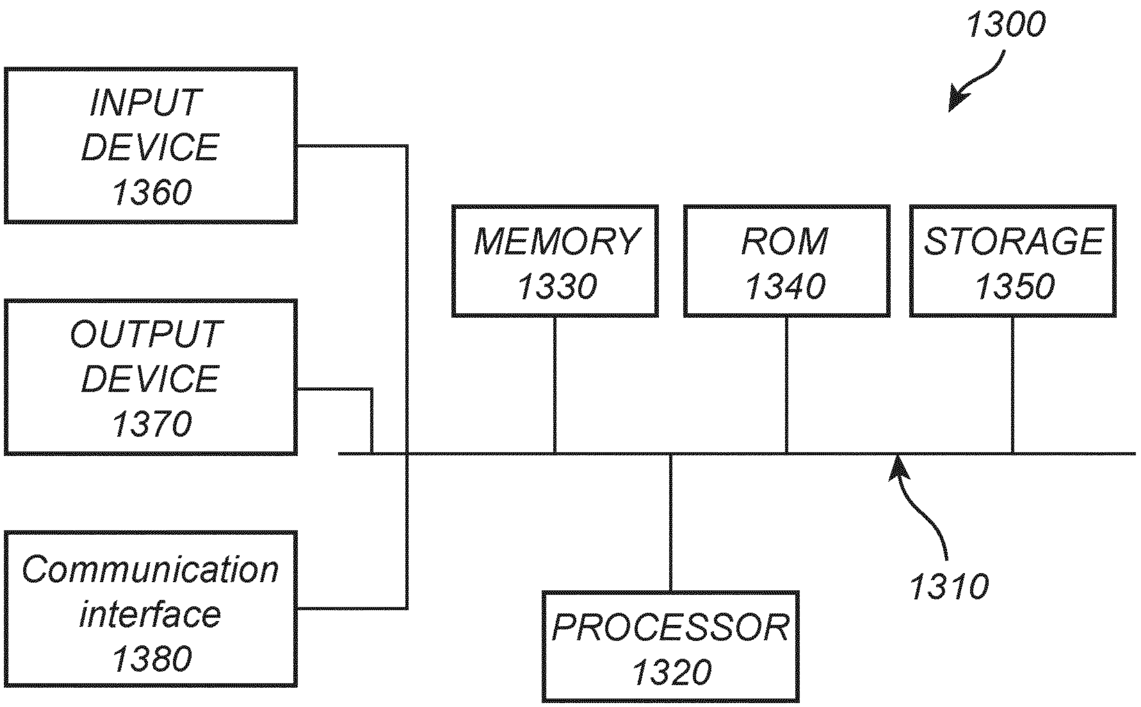
FIG. 13 is an exemplary schematic controller according to one aspect of the disclosure.

FIG. 13 is a diagram of an exemplary controller 1300 as described earlier in which methods and systems described herein may be implemented. The controller 1300 may include a bus 1310, a processor 1320, a memory 1330, a read only memory (ROM) 1340, a storage device 1350, an input device 1360, an output device 1370, and a communication interface 1380. The bus 1310 permits communication among the components of controller 1300. The bus may be any of several types of bus structures that may further interconnect to a memory bus (with or without a memory controller), a peripheral bus, and/or a local bus using any of a variety of bus architectures. The controller 1300 may also include one or more power supplies (not shown). One skilled in the art would recognize that controller 1300 may be configured in a number of other ways and may include other or different elements.

The processor 1320 may include any type of processor or microprocessor that interprets and executes instructions. The processor 1320 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor may further include computer executable code that controls operation of the programmable device. The processor 1320 may also include logic that is able to receive and compile instructions and interpret different signal, and also generate output to, for example, a speaker, a display, etc.

The memory 1330 may include a random-access memory (RAM) or another dynamic storage device that stores information and instructions for execution by processor 1320. Memory 1330 may also be used to store temporary variables or other intermediate information during execution of instructions by processor 1320. The memory 1330 may be one or more devices for storing data and/or computer code for completing or facilitating methods described herein. The memory may include database components, object code components, script components, or other types of information structure for supporting the various activities herein. Any distributed or local memory device may be utilized with the systems and methods of this description. The memory may be communicably connected to the processor device (e.g., via a circuit or any other wired, wireless, or network connection) and may include computer code for executing one or more processes described herein. The memory may include non-volatile memory 1340 (e.g., read-only memory (ROM), erasable programmable read-only memory (EPROM), electrically erasable programmable read-only memory (EEPROM), etc.), and volatile memory (e.g., random-access memory (RAM)), or any other medium which can be used to carry or store desired program code in the form of machine-executable instructions or data structures and which can be accessed by a computer or other machine with a processor. A basic input/output system (BIOS) may be stored in the non-volatile memory 1340 and can include the basic routines that help to transfer information between elements within the controller.

ROM 1340 may include a conventional ROM device and/or another static storage device that stores static information and instructions for processor 1320. Storage device 1350 may include a magnetic disk or optical disk and its corresponding drive and/or some other type of magnetic or optical recording medium and its corresponding drive for storing information and instructions. Storage device 1350 may also include a flash memory (e.g., an electrically erasable programmable read only memory (EEPROM)) device for storing information and instructions.

Input device 1360 may include one or more conventional mechanisms that permit a user to input information to the controller 1300, such as a keyboard, a keypad, a directional pad, a mouse, a pen, voice recognition, a touch-screen and/or biometric mechanisms, etc. Output device 1370 may include one or more conventional mechanisms that output information to the user, including a display, a printer, one or more speakers, etc. Communication interface 1380 may include any transceiver-like mechanism that enables controller 1300 to communicate with other devices and/or systems. For example, communication interface 1380 may include a modem or an Ethernet interface to a LAN. Alternatively, or additionally, communication interface 1380 may include other mechanisms for communicating via a network, such as a wireless network. For example, communication interface may include a radio frequency (RF) transmitter and receiver and one or more antennas for transmitting and receiving RF data.

The controller 1300, consistent with the disclosure, provides a platform through which the various functions of applicator stand alone or in combination with a printer are controlled. The controller 1300 may also display information associated with the label application status of printer relevant information.

According to an exemplary implementation, controller 1300 may perform various processes in response to processor 1320 executing sequences of instructions contained in memory 1330. Such instructions may be read into memory 1330 from another computer-readable medium, such as storage device 1350, or from a separate device via communication interface 1380. It should be understood that a computer-readable medium may include one or more memory devices or carrier waves. Execution of the sequences of instructions contained in memory 1330 causes processor 1320 to perform the acts that have been described. In alternative embodiments, hard-wired circuitry may be used in place of or in combination with software instructions to implement aspects consistent with the disclosure. Thus, the disclosure is not limited to any specific combination of hardware circuitry and software.

The gap sensor may also be arranged in label dispensers, used to dispense pre-printed labels. Both printers and dispensers need to detect where a new label starts in order to deliver the labels correctly. Label printers also need to print on the correct position.

There are two main designs for label printers/dispensers, open and closed. The open design is the most common design. The closed design is more robust and adjustment free, but it has some known downsides which this disclosure negates.

An open design is most common for both label printers and label dispensers/applicators. The design could be described as a large two-legged fork, where new media, labels and ink ribbon when used, can be loaded between the two fork legs from the side.

An open design makes is easy to load new media, and eliminates the risk of error such as not feeding the label through the sensor, but the design stability/rigidity becomes a challenge. Especially when using a thermal printhead that needs to be pressed against the label material with some force, increasing the need for stability.

One way of overcoming this challenge is to add an openable connecting mechanism between the print head bracket and the part holding the drive/print roller, between which there needs to be pushing force. This mechanism adds stability, but it needs to be both very durable and very precise not to influence the tight tolerances needed in a label printer.

Label/media sensors usually have a fixed gap and the shape of a fork where the label must be guided between the two media sensor fork-legs. This aligns well with the open deign.

The standard fork-type label/media sensor reads through the label and the backing paper/liner in order to detect where the gaps between the labels are. This could be done with several different methods, such as for example infra-red light, ultrasound or by reading capacitive changes which is created by the gap between the labels.

If an ink-ribbon is used in a label-printer, then the ink-ribbon is normally not routed through the label/media/gap-sensor.

This means that with the open design it is possible to use a variety of different label/media/gap-sensors making it flexible to handle different types of labels and ink-ribbons if used.

In summary, the open design is generally easy to use and flexible; but requires adjustments to handle the mechanical tolerances in the design as well as changes over time.

The design may also be closed. When produced using precision tools such as a CNS-machine and when combined with precision components such as for example ball bearings, the complete solution becomes very precise and robust, negating the needs for any adjustments both from start and over time.

The major challenge with a closed design is the label/media/gap-sensor. Due to the closed design, the labels can't be loaded from the side using the standard fork-type label/media/gap-sensor.

The closed design can be compared with a gate or door, where the gate needs to open wide enough to allow for hands to load media through it. Using a normal form-type media sensor with a small gap then becomes a bad option complicating the label change.

There are at least two previously known methods to make the label change easy when using a closed design, but both of them have media flexibility drawbacks.

One solution is to use a reflective type of label/media/gap-sensor looking at the backing paper/liner from below, using for example infra-red light, detecting the changes in contrast when there is a gap between the labels. This method solves many scenarios but when there is print underneath the label or when there is a very strong contrast pre-printed in top of the label then the reflective sensor can't detect the label gaps reliably.

The other method, typically applied to a label printer, is to read through the label and the backing paper/liner, but to split the sensor in two parts. One part, transmitter or receiver, is placed under the backing paper/liner and the other complementary part, transmitter or receiver, is placed in the part holding the printhead, which normally move away from the labels when it is time to change labels.

This creates a natural opening allowing for an easy label change. However, when combined with ink-ribbon there are some strong limitations introduced. When placing the two sensor parts in this way there will always be not only labels and backing paper/liner but also the ink-ribbon between the two sensor parts. Infra-red light will have difficulties penetrating the ink-ribbon will add significant noise to ultrasound sound signal making it unreliable. A capacitive sensor would still be able to detect the label gaps, but the gaps would make the distance between the sensor parts change which in return would disturb the signal. This could be compensated for by adding an extra capacitive sensor to compensate for the mechanical movement, but it would create a very complicated sensor.

The media/label/gap-sensor according to the present disclosure can be used in a closed design and it allows for as easy label change as do both the reflective-sensor option and the reflective-sensor option above. Yet the arrangement according to one aspect of the disclosure has the following two main characteristics:

1. It doesn't use a reflective reading method from underneath the backing paper/liner. It reads through both the labels and the backing paper/liner.
2. It reads through the labels and the backing paper/liner, but it doesn't read through the ink-ribbon, making it as flexible as a standard for-type media/label/gap-sensors.

According to the disclosure, the media/label/gap-sensor can be combined with a closed adjustment free design with maintained ease of use and with maintained sensor performance and flexibility.

This teaching of the disclosure also allows for a label printer with labels adjusted to, or close to, the centre of the printhead, which is not possible with a standard fork type media sensor, as the fork-legs are normally too short.

Label applicator systems, as well as systems that both print and apply labels often need to adopt to uneven surfaces when applying the labels. This due to target products not always being perfectly flat and/or aligned.

Solutions on the label applicator, designed to adopt to the uneven surfaces work best if they can operate in a symmetric fashion with the label placed in the centre of the label applicator.

This could be achieved by having a mechanical adjustment/configuration between the label printer/dispenser and the label application module to ensure that the labels are always presented/fed to the applicator adjusted to a centre line.

However, it could also be achieved by always having the label roll adjusted to a centre line on the label printer/dispenser.

In addition, many product packaging/sealing machines feed out products in the centre of a conveyor belt. Often different label sizes are being used on the same production line and the labels should be applied onto the target products adjusted to the centre of the conveyor belt.

It is desirable to have as few mechanical adjustments as possible in order to achieve label application in the centre of the product conveyor belt.

By having the label roll adjusted to the centre of the label printer/label dispenser, the above can be achieved with the three main modules in the system mechanically fixed to each other, allowing for a simplistic total system with no further mechanical adjustments. All three modules being:

1. The label printer/dispenser
2. The label applicator
3. The conveyor belt/production line The most common label printer and label dispenser design has the labels adjusted to one side. Left or right making it impossible to fix the three modules above to each other.

Consequently, with the labels adjusted to the left or the left of the label printer/dispenser, the label applicator module will have to be movable to the left/right in relation to the label printer/dispenser in order to get the labels fed onto the label applicator in the centre.

By having the labels adjusted to the centre of the printhead makes it possible to have the label applicator module fixed in a cantered position in a print and apply system. Having both the label applicator module and the labels adjusted to the centre of the printhead allows for a symmetric adaptability to uneven surfaces.

Figure 14:
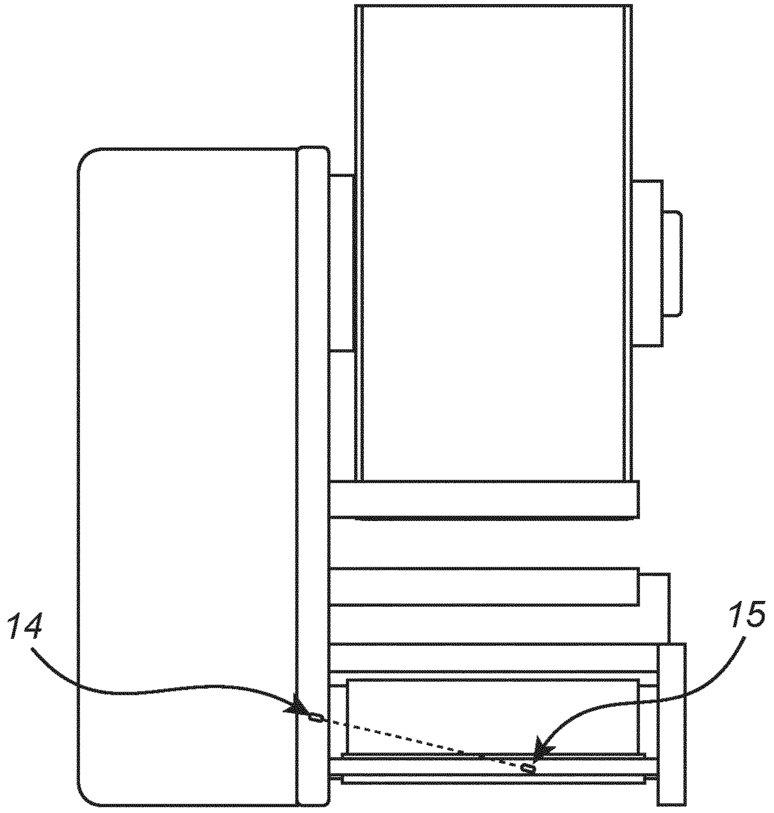
FIGS. 14 and 15 illustrate an arrangement of media sensor according to one aspect of the disclosure.
Figure 15:
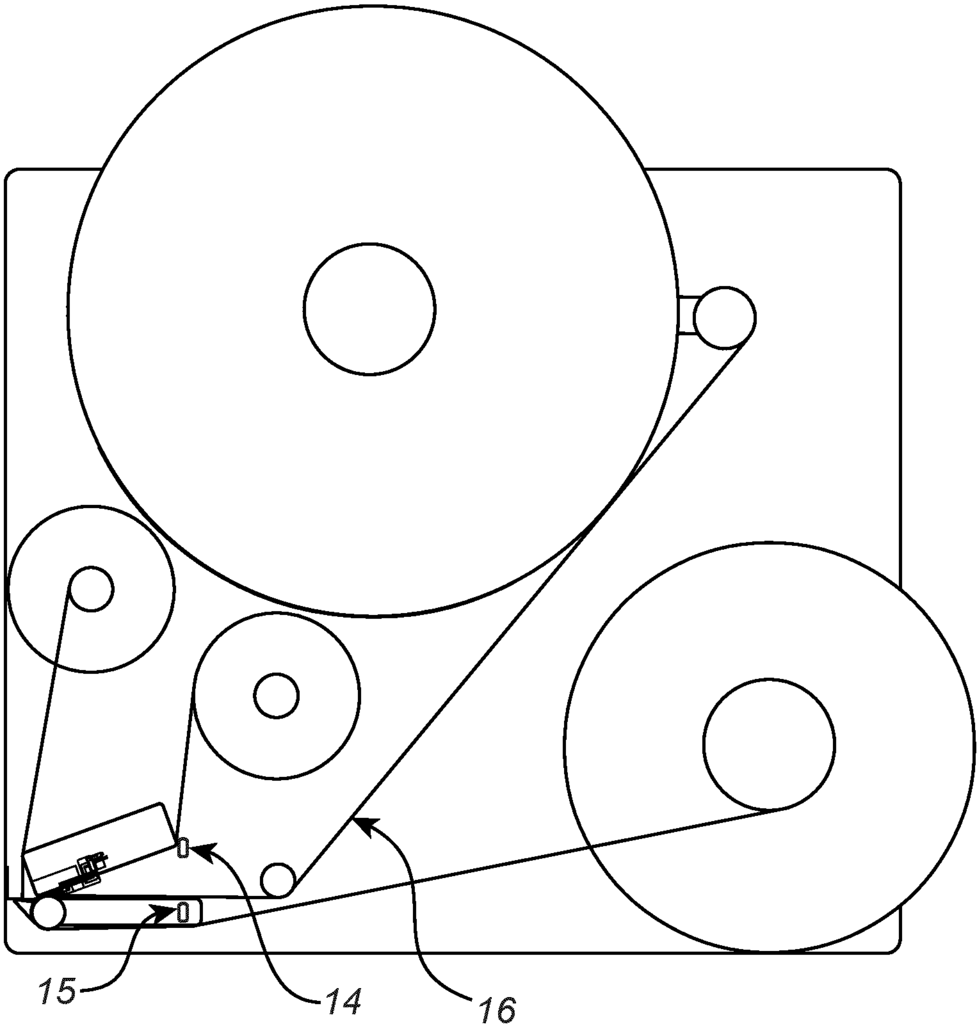

In one exemplary design according to the present disclosure, as illustrated in FIGS. 14 and 15, one part 190 of a media detector sensor can be located in an angle in the fixed part under the backing paper and the other part 180 located above and beside the label path 160, for example in the main frame 101, the label change process will be very easy. The paper track can move up and down but not to the sides which will ensure the label edge detection accuracy. Thus, the sensor parts form vertexes of a substantially right triangle and the electromagnetic signal transmitted and received by the sensor parts build the hypotenuse side of the triangle side, such that the vertex angels are different from 90 degrees.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be implemented at least in part by means of both hardware and software, and that several "means", "units" or "devices" may be represented by the same item of hardware.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Software and web implementations of various embodiments of the disclosed methods can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A thermal printer for printing on print media, comprising:

a printhead, and a printhead positioning arrangement configured to displace the printhead into at least three positions: a first position in which the printhead applies a first amount of pressure on a print medium, a second position in which the printhead applies a second amount of pressure on the print medium, and a third position in which the printhead is distanced from the print medium and applies no pressure on the print medium, wherein the printhead positioning arrangement includes:

an actuator, a first arm, a first end of the first arm being connected to a drive shaft of the actuator, and a second arm, a first end of the second arm being connected to a second end of the first arm, and a second end of the second arm being connected to a bracket which holds the printhead, the bracket being rotatable about an axis relative to a support structure.

2. The thermal printer according to claim 1, wherein the printhead positioning arrangement is configured to apply an equal pressure as that applied to the print medium in each of the first, second and third positions, to a print ribbon configured to run parallel with the print medium.

3. The thermal printer according to claim 1, wherein the second arm is mechanically and rotatably connected to the bracket such that movement of the second arm causes the bracket to pivot about the axis.

4. The thermal printer according to claim 1, further comprising a roller, bearings holding the roller, and a shaft about which the bracket is rotatable about the axis, the shaft being attached to a first support on a first side of the support structure thermal printer and a second support on a second side of the support structure.

5. The thermal printer according to claim 1, further comprising a sensor configured to provide a signal indicative of a position of the actuator at startup of the thermal printer.

6. The thermal printer according to claim 5, wherein the sensor comprises one of a printhead positioning rotation sensor or a relative printhead positioning sensor.

7. The thermal printer according to claim 1, comprising a memory configured to store a reference position corresponding to a stop position for movement of the first-second arm.

8. The thermal printer according to claim 1, further comprising a print media sensor, the print media sensor comprising a first part and a second part: the first part being configured as a transmitter for transmitting an electromagnetic signal and the second part being configured as a receiver for receiving the electromagnetic signal, and wherein the first and the second parts are arranged such that they form vertexes of a right triangle and an electromagnetic signal path of the electromagnetic signal between the first part and the second part is a hypotenuse side of the right triangle.

9. The thermal printer according to claim 1, wherein in the second position the printhead is adjacent to but distanced from a print ribbon positioned between the print medium and the printhead.

10. The thermal printer according to claim 1, wherein the printhead positioning arrangement comprises a flexible coupling.

11. The thermal printer according to claim 1, wherein the printhead is configured to be set in the third position and kept in the third position, to enable the thermal printer to operate as a label dispenser.

12. In a thermal printer, a method for controlling position of a printhead, including controlling a printhead positioning arrangement to displace the printhead into three positions:

a first position applying a first amount of pressure on a print medium during a print operation, a second position applying a second amount of pressure on the print medium when no print operation is executed, and a third position in which the printhead is distanced from the print medium and applies no pressure on the print medium;

wherein the method includes operating a driving mechanism of the printhead position arrangement to rotate a drive shaft, the drive shaft being connected to a first arm, such that rotation of the drive shaft causes rotation of the first arm, the first arm being connected to a second arm, such that rotation of the first arm causes rotation of the second arm, the second arm being connected to a bracket which holds the printhead, and the bracket being rotatably connected to a support structure, such that rotation of the second arm causes rotation of the bracket relative to the support structure and displacement of the printhead.

13. The method of claim 12, further comprising:

when in said first position, in which the printhead applies a predetermined force $F_{dot}$, receiving information indicative of a printhead position;

when an active print assignment is ended, displacing the printhead to the second position; and, optionally, moving to the third position upon reception of an instruction.

14. The method according to claim 12, further comprising controlling a ribbon rewinder in a torque controlled configuration when the printhead is in said first position and controlling the rewinder in a speed controlled configuration when the printhead is in said third position.

15. The method according to claim 12, wherein the method comprises:

when the printhead is in the first position, controlling a web path of the print medium by controlling a roller, and applying a predetermined pressure of the printhead against the roller;

measuring a length of the print medium and a diameter of rewound print medium;

displacing the printhead to the second position during a print cycle but not during active printing with respect to the length of the print medium and the diameter of the rewound print medium; and controlling a print medium rewind speed, wherein feeding the print medium is assisted by the print medium pushing against the roller during the print cycle.

16. The method according to claim 15, wherein an angle between the first arm and the second arm is monitored to detect variations in the print medium thickness, a printhead thickness and a diameter of the roller, to adjust an amount of a torque from the driving mechanism to achieve a constant first pressure of the printhead against the print medium when the printhead is in said first position.

17. The method according to claim 12, wherein in the second position the printhead is positioned adjacent to but distanced from a print ribbon positioned between the print medium and the printhead.

18. A thermal printer configured for printing on print media, comprising:

a printhead, and a printhead positioning arrangement configured to displace the printhead into at least three positions: a first position in which the printhead applies a first amount of pressure on a print medium, a second position in which the printhead applies a second amount of pressure on the print medium, and a third position in which the printhead is distanced from the print medium and applies no pressure on the print medium, wherein the printhead positioning arrangement includes:

a driving mechanism, a first arm, a first end of the first arm being connected to a drive shaft of the driving mechanism, and a rollable actuator, the rollable actuator being connected to a second end of the first arm and the rollable actuator being engaged with a bracket which holds the printhead, wherein the bracket is rotatable about an axis relative to a support structure to displace the printhead into said three positions, and the rollable actuator is configured to roll along the bracket to apply a first force to the bracket, to cause the bracket to rotate about the axis to displace the printhead into said three positions.

19. The thermal printer of claim 18, wherein the printhead positioning arrangement comprises a spring mechanism mechanically attached to the bracket, configured to apply a second force on the bracket to displace the printhead.

20. The thermal printer according to claim 18, further comprising a shaft about which the bracket is rotatable about the axis, the shaft being attached to a first support on a first side of the support structure and a second support on a second side of the support structure.

21. The thermal printer according to claim 18, further comprising a sensor configured to provide a signal indicative of a position of the actuator at startup of the thermal printer, wherein, optionally, the sensor comprises one of a printhead positioning rotation sensor or a relative printhead positioning sensor, and optionally, the thermal printer further comprises a print media sensor, the print media sensor comprising a first and a second part: the first part being configured as a transmitter for transmitting an electromagnetic signal and the second part being configured as a receiver for receiving the electromagnetic signal, and optionally, wherein the first and the second parts are arranged such that they form vertexes of a right triangle and an electromagnetic signal path of the electromagnetic signal between the first part and the second part is a hypotenuse side of the right triangle.

22. The thermal printer according to claim 18, wherein in the second position the printhead is adjacent to but distanced from a print ribbon positioned between the print medium and the printhead.

23. The thermal printer according to claim 18, wherein the printhead positioning arrangement comprises a flexible coupling.

24. The thermal printer according to claim 18, wherein the printhead is configured to be set in the third position and kept in the third position, to enable the thermal printer to operate as a label dispenser.

* * * * *